(12) United States Patent
Agrawal et al.

(10) Patent No.: US 8,599,467 B2
(45) Date of Patent: Dec. 3, 2013

(54) ENVIRONMENTALLY SAFE ELECTROCHROMIC DEVICES AND ASSEMBLIES

(75) Inventors: Anoop Agrawal, Tucson, AZ (US); John P. Cronin, Tucson, AZ (US); Juan Carlos L. Tonazzi, Tucson, AZ (US)

(73) Assignee: AJJER, LLC, Tucson, AZ (US)

( * ) Notice: Subject to any disclaimer, the term of this patent is extended or adjusted under 35 U.S.C. 154(b) by 525 days.

(21) Appl. No.: 12/865,688

(22) PCT Filed: Jan. 29, 2009

(86) PCT No.: PCT/US2009/032491
§ 371 (c)(1),
(2), (4) Date: Oct. 22, 2010

(87) PCT Pub. No.: WO2009/099900
PCT Pub. Date: Aug. 13, 2009

(65) Prior Publication Data
US 2011/0051219 A1 Mar. 3, 2011

Related U.S. Application Data

(60) Provisional application No. 61/063,160, filed on Jan. 31, 2008, provisional application No. 61/068,042, filed on Mar. 4, 2008, provisional application No. 61/056,311, filed on May 27, 2008.

(51) Int. Cl.
*G02F 1/15* (2006.01)

(52) U.S. Cl.
USPC .......................................................... 359/265

(58) Field of Classification Search
USPC ........... 359/265, 272; 349/189, 190, 153, 154
See application file for complete search history.

(56) References Cited

U.S. PATENT DOCUMENTS

| | | | |
|---|---|---|---|
| 3,280,701 A | 10/1966 | Donnelly et al. |
| 4,712,879 A | 12/1987 | Lynam et al. |
| 4,761,061 A | 8/1988 | Nishiyama et al. |
| 4,902,108 A | 2/1990 | Byker |
| 5,128,799 A | 7/1992 | Byker |
| 5,140,455 A | 8/1992 | Varaprasad et al. |
| 5,239,405 A | 8/1993 | Varaprasad et al. |
| 5,424,865 A | 6/1995 | Lynam |
| 5,500,760 A | 3/1996 | Varaprasad et al. |
| 5,668,663 A | 9/1997 | Varaprasad et al. |
| 5,679,283 A | 10/1997 | Tonar et al. |
| 5,724,187 A | 3/1998 | Varaprasad et al. |
| 5,818,625 A | 10/1998 | Forgette et al. |
| 5,928,972 A | 7/1999 | Mashiko et al. |

(Continued)

FOREIGN PATENT DOCUMENTS

WO  WO03011939  2/2003

OTHER PUBLICATIONS

"Managing Health Effects of Beryllium Exposure." National Research Council. The National Academic Press, Washington, DC, 2008.

(Continued)

*Primary Examiner* — Joseph P Martinez

(57) ABSTRACT

This invention recognizes the hazards of materials used to make electrochromic devices and the resulting mirror assemblies for automotive use. The invention provides novel ways to reduce these hazards and to manufacture these mirrors using renewable resources and smaller environmental footprint.

9 Claims, 4 Drawing Sheets

(56) References Cited

U.S. PATENT DOCUMENTS

| | | |
|---|---|---|
| 5,985,184 A | 11/1999 | Lynam |
| 6,002,511 A | 12/1999 | Varaprasad et al. |
| 6,111,684 A | 8/2000 | Forgette et al. |
| 6,203,304 B1 * | 3/2001 | Lopez et al. ............ 425/110 |
| 6,245,262 B1 | 6/2001 | Varaprasad et al. |
| 6,317,248 B1 | 11/2001 | Agrawal et al. |
| 6,327,069 B1 | 12/2001 | Allemand et al. |
| 6,473,148 B1 | 10/2002 | Suh |
| 6,853,472 B2 | 2/2005 | Warner et al. |
| 6,870,656 B2 | 3/2005 | Tonar et al. |
| 6,899,437 B2 | 5/2005 | Bauer |
| 6,961,168 B2 | 11/2005 | Agrawal et al. |
| 7,009,751 B2 | 3/2006 | Tonar et al. |
| 7,064,212 B2 | 6/2006 | Burrell et al. |
| 7,087,878 B2 | 8/2006 | Nixon et al. |
| 7,101,596 B2 | 9/2006 | Sakano et al. |
| 7,119,937 B2 | 10/2006 | Warner et al. |
| 7,292,306 B2 | 11/2007 | Hwang |
| 7,300,166 B2 | 11/2007 | Agrawal et al. |
| 2004/0146720 A1 | 7/2004 | Ichiki et al. |
| 2004/0233537 A1 | 11/2004 | Agrawal et al. |
| 2006/0285190 A1 | 12/2006 | Agrawal et al. |
| 2007/0193624 A1 | 8/2007 | Krasnov |
| 2007/0285789 A1 | 12/2007 | Lindahl et al. |
| 2008/0074724 A1 | 3/2008 | Agrawal et al. |
| 2009/0002803 A1 | 1/2009 | Tonar et al. |

OTHER PUBLICATIONS

Ishida, et al. "Highly conductive transparent F-doped tin oxide films were prepared by photo-CVD and thermal-CVD." Thin Solid Films. vol. 281/282. 1996. p. 228-231.

Tolner et al. "Transparent Conductive Oxides for Display Applications." Information Display. Apr. 2008. vol. 24. p. 28-32.

Michaelis et al. "Electronic Dye System for Smart Window Applications." Advanced Materials 2001. 13. No. 23 Dec. 3. p. 1825-1828.

Z-Axis Adhesive Film 5352R. 3M. Jun. 1999.

Z-Axis Adhesive Film 5460R. 3M. May 2000.

Z-Axis Adhesive Film 5552R. 3M. Jun. 1999.

Electrically Conductive Adhesive Transfer Tape 9703. 3M. May 2007.

Anisotropic Conductive Film Adhesive 7303. 3M. Jan. 2007.

Brisson et al. "Beryllium. Environmental Analysis and Monitoring." RSC Publishing. Royal Society of Chemistry 2009. pg. cover, table of contents and chapter 1.

* cited by examiner

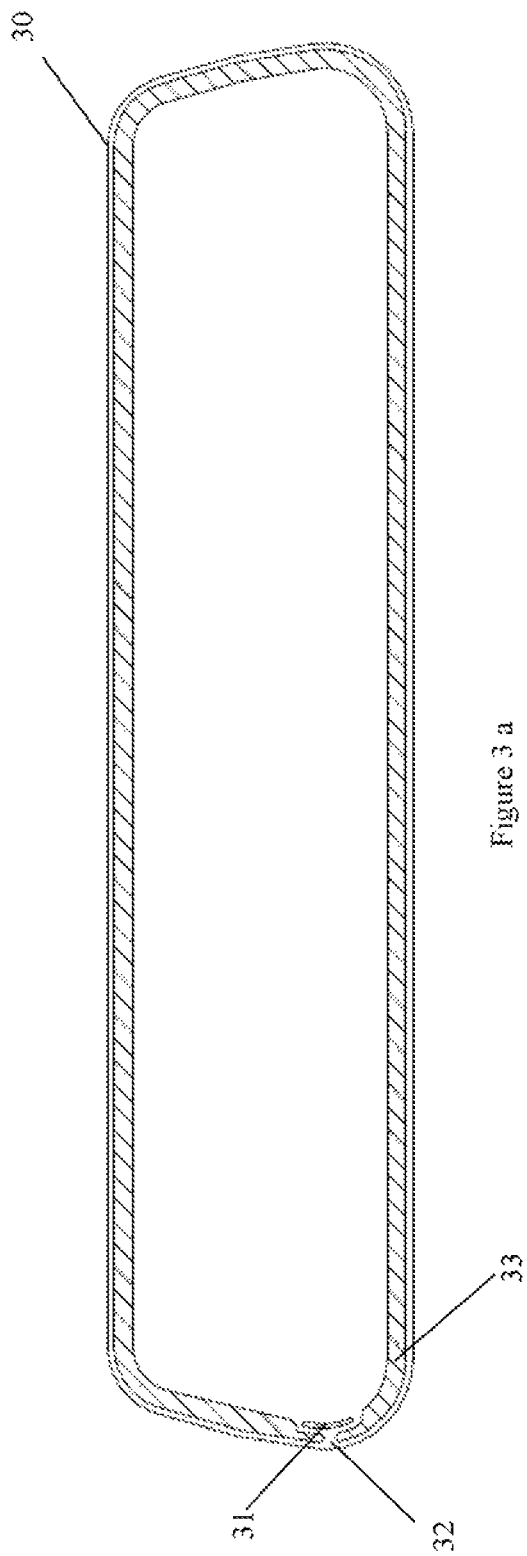
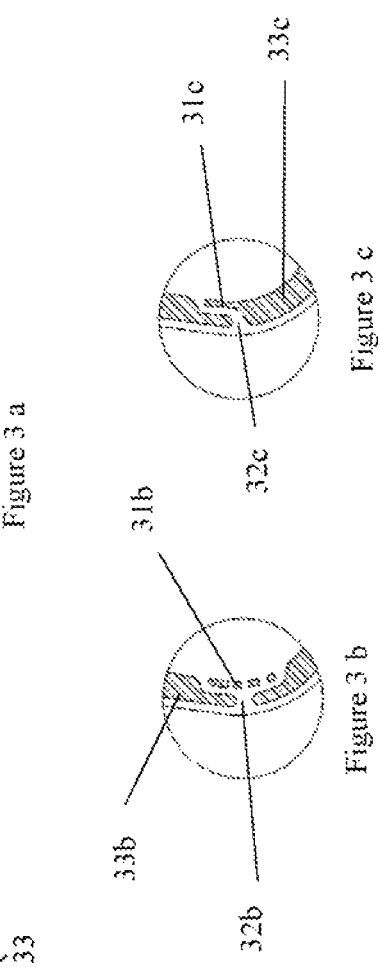
Figure 3 a
Figure 3 b
Figure 3 c

ENVIRONMENTALLY SAFE ELECTROCHROMIC DEVICES AND ASSEMBLIES

RELATED APPLICATION/CLAIM OF PRIORITY

This application is a national stage application under 35 U.S.C. §371 of, and claims priority from, International Application No. PCT/US09/32491, filed 29 Jan. 2009, which is a PCT Application of provisional patent application Ser. Nos. 61/063,160, Filed Jan. 31, 2008 (entitled "Environmentally safe EC devices and assemblies"); 61/068,042 filed on Mar. 4, 2008 (entitled "Environmentally safe EC devices and assemblies); and 61/056,311 filed on May 27, 2008 (entitled "Environmentally safe EC devices and assemblies); all of which are incorporated by reference herein.

BACKGROUND OF THE INVENTION

Electrochromic rearview mirrors have long been incorporated into vehicles for providing automatic control of glare to a vehicle operator. EC rearview mirrors are often times mounted both inside and outside the vehicle or only on the inside. Some of the patents that describe electrochromic devices usable for mirrors are U.S. Pat. Nos. 3,280,701; 4,712,879; 4,902,108; 5,140,455; 5,724,187; 6,111,684; 6,166,848; 6,853,472 and published patent application 2004/0233537.

Commercially available mirror assemblies comprise of an EC cell enclosed in a casing along with attachment mechanism to the vehicle, powering electronics and other electrical and electronic features. These mirror assemblies may comprise of materials which are harmful to the environment. In one aspect this invention describes novel combination of materials to reduce environmental degradation and safety, particularly for those who are involved when these systems are being made, removed, recycled or disposed at the end of their life cycle.

Most EC mirrors for vehicles in the market use a construction as shown in FIG. 1a. This prior art is shown schematically as a device cross-section, where an EC mirror is constructed using two substrates 10 and 20. 21 is a transparent conductor and 11 is a layer or a layer stack which is both electrical conductor and a reflector. This is assembled into a cavity using a perimeter adhesive 15 where the cavity thickness is determined by spacers in the adhesive and/or sprinkled throughout the cavity (not shown). The interior of the cavity has an electrochromic medium 23 which may comprise of one or more layers. For electrical connections busbar clips are attached to both substrates as 17 and 18 which are then connected to powering wires 13 and 14 respectively. The busbar clips in commercial mirrors are generally made of copper-beryllium alloy as described earlier; however, beryllium free busbars are preferred for environmental reasons. The electrical connections and the adhesive line is concealed from the user by an opaque bezel 16, generally made out of a colored plastic material (usually polypropylene, polyurethane or acrylonitrile-butadiene-styrene terpolymer).

FIG. 1a, shows a third surface mirror. The surfaces on the substrate are counted from the side the mirror is viewed, where the first surface is outside surface of the first substrate, the second surface is the inner surface of the second substrate, the third surface is the inner surface of the second surface and the fourth surface is the outside surface of the second substrate. The third surface reflective layer may comprise of several coats of materials both transparent conductors and reflective layers. More on this is discussed in several US patents such as U.S. Pat. Nos. 3,280,701, 5,724,187, 5,818, 625 and published US patent application 2004/0233537. When the reflector is on the third surface then the mirrors are called third surface mirrors, and when the reflector is on the fourth surface then they are called fourth surface mirrors. As shown in FIG. 1a, the mirror cell is assembled using two substrates (20 and 10) coated with conductive coatings (21 and 11 respectively), and these are bonded using a perimeter sealant 15. During their manufacture a small hole is left in the sealant through which the electrolyte 23 is introduced in the chamber formed by the two substrates. Typically the perimeter sealant has spacer beads which result in a controlled chamber thickness. After filling the chamber (also called cavity) the hole is generally sealed with a UV curing sealant (also called plug sealant), Clips 17 and 18 are generally used to connect the conductive coatings on the substrates using wires 13 and 14 to the rest of the electronics. This mirror is enclosed in a case and 16 shows the front bezel of the case (one may also make without bezels as discussed in US patent application 2008/0074724). In the mirror housing (behind the mirror one has electronics) to power the mirror and provide any other features. FIG. 1b shows the schematics on a simplest EC mirror assembly. The EC mirror is powered and controlled by a controller which may be in the same housing as the mirror (which is generally the case) or external to it. The controller may have integrated chips which preferably should not use any components utilizing beryllium or beryllium oxide. The controller is supplied by power from the car power system or one may use a secondary (rechargeable) or a primary battery. It also receives two light intensity signals, one for glare level (typically a light transducer or sensor facing towards the rear of the car) and the other for ambient light (which is typically facing towards the front of the car), so that it can compare and decide if the glare is being caused at night by a vehicle trailing the car with the system. The controller may have other inputs such as if the car is in reverse gear or not (so that the EC mirror darkening may be disabled automatically when reversing), inputs for other added features such as for temperature, cameras for video displays, micro-phone and speaker for phone system, and may have added features such as compass, rain sensor, garage door openers, headlight control amongst many others. Many of these features are described in several patents and patent applications. Some of these are US patent application 2007/0,285,789; and U.S. Pat. No. 7,087,878.

Most commercial EC automotive mirrors use liquid or solid electrolytes, which when disposed have the potential to contaminate. To minimize disposal volume, it is preferred to reduce the quantity of electrolyte in these mirrors. The electrolytes typically comprise of electrochromic dyes, UV stabilizers, electrolytic salts, monomers, initiators, and polymers.

Commercial EC mirrors use glass coated with transparent conductors. These conductive coatings are usually indium tin oxide. Indium is an expensive material and is getting scarce due to its increased use in solar cells and displays. Other Conductors such as cheaper fluorine doped tin oxide are also used. However, for commercial mirror products fluorine tin oxide based conductors are not used when the substrate is thinner than about 2.3 mm. This invention also discloses use of tin oxide based conductors on thinner substrates to reduce weight to promote environment friendly cars (increased gas mileage) while also reducing cost. In another variation a standard 2.2 to 2.4 mm thick substrate with fluorine based tin oxide conductor may be combined with a thinner back element to fabricate a third surface EC mirror.

BRIEF SUMMARY OF THE INVENTION

One objective of this invention is to disclose electrochromic mirrors and devices with materials which result in safer environment for the people who are associated with it during manufacture, its use and disposal, while also reducing environmental pollution.

Another objective of this invention is to be able to fabricate EC mirrors with reduced electrolyte quantity to be able to reduce the chemicals introduced in landfills or disposal processes.

Yet another objective of this invention is to disclose EC mirrors that have reduced environmental impact by recycling components and making use of materials that are recycled, made from renewable sources or produced with reduced resource use.

Another objective of this invention is to disclose EC mirrors with tin oxide based conductive coatings on thinner substrates or in combination with thinner substrates.

DESCRIPTION OF THE DRAWINGS

FIGS. 3a-c: Drawing of a perimeter sealant and a plug seal dam on a rear view mirror substrate, and some examples of various dam geometries.

DETAILED DESCRIPTION OF THE INVENTION

Embodiment 1

Low Toxicity Mirrors

Figure 1A:
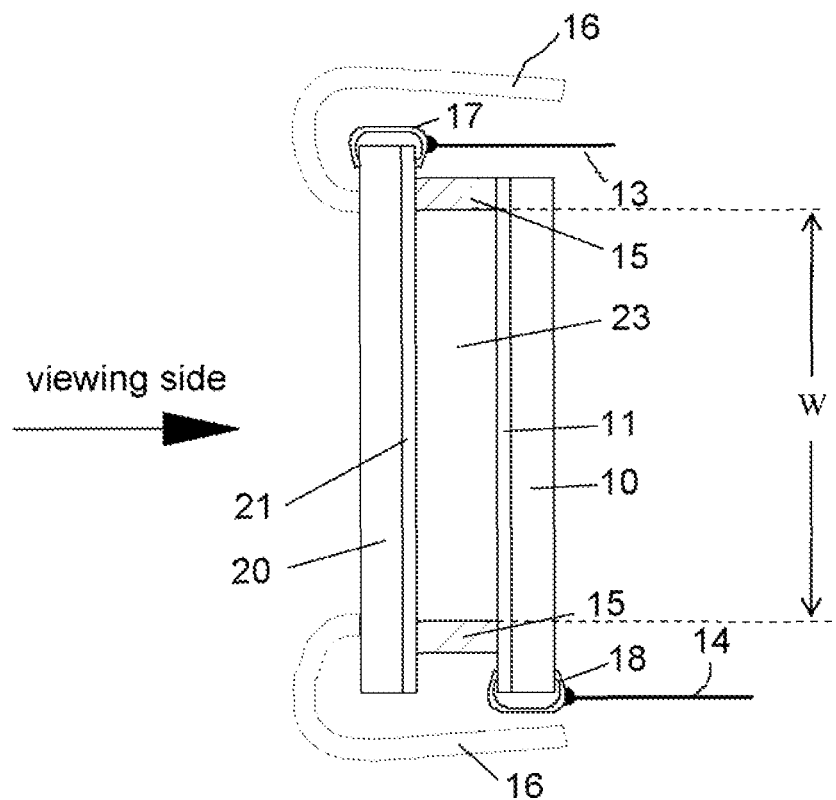
FIG. 1a: Construction of a prior art EC device.

With the increased numbers of variable reflectance mirrors being used, there is a correspondingly increased desire to provide an environmentally improved variable reflectance mirror design. Millions of mirrors are being produced annually that incorporate variable reflectance elements with the above mentioned components. As an example U.S. Pat. No. 6,899,437 addresses this issue and this patent is herein incorporated in its entirety by reference. As discussed below this patent recognizes elements such as cadmium, mercury and lead and some compounds having chlorine, bromine and antimony as threats to the environment. However, this does not recognize threats caused by beryllium. Further, U.S. Pat. No. 6,899,437 takes the European directive 2002/95/EG, "Restrictions pertaining to the use of certain Hazardous Substances" (RoHS) and translates them into claims without providing any new initiative on environmental friendliness. Many countries such as Japan, China, Korea, Taiwan and some states in US (e.g., California) have laid guidelines on their own RoHS equivalent programs. The toxic materials covered by RoHS are lead, cadmium, mercury, hexavalent chromium, and brominated flame retardants more specifically polybrominated biphenyls (PBB), polybrominated diphenyl ethers (PBDE).

Further, these restrictions also allow certain products to be exempt of specific toxins and will vary from one country to the other, in general, some of the materials that may be used for mirrors may still contain these restricted materials while meeting the European directive mentioned above. For example, lead is allowed in various products, such as copper alloys (up to 4% lead), aluminum alloys (up to 0.4% lead), which may be used for busbars. In paints the allowable limit for lead is 0.01% (or 100 ppm) which may be used to protect reflective coatings for fourth surface mirrors. Also, lead is used in electrical cables as jackets and lead based compounds are added for stabilization and in such cases it should not exceed 300 ppm. If batteries are used to power the mirrors in case if the power from vehicle is not used then these batteries may contain up to 0.01% lead. Lead containing electronic ceramics (e.g., ferroelectric devices for memory or other applications) and high melting point solders are exempt from these restrictions. For mercury, one may use lamps for backlighting of displays which may comprise of mercury; these displays are incorporated in mirrors or their housings for a variety informational outputs or videos (direction, temperature, view from a camera during back-up). In general mercury, hexavalent chromium and cadmium (the last two are used in corrosion resistant coatings, and cadmium is also used in photosensors to detect glare in mirrors) has to be limited to 100 ppm. The flame retardants mentioned above may be used up to 0.1%. Norway is planning on adopting products with lower amounts of Arsenic. A product that uses Arsenic is GaAs based semiconductor chips used for communications. According to this, the products with 0.01 percent or less arsenic content (by weight) in the product's homogenous component parts is allowed. This may also be adopted by European Union and others with time. This will limit the amount and number of communication chips to be used in mirrors with GaAs that may be used for GPS, and cellular phone and other short range communication links. Clearly these regulations can change at any time and are also different for different geographic areas mentioned above, but the mirrors can comprise small quantities of one or more of lead, mercury, cadmium, hexavalent chromium and brominated flame retardants and arsenic and still meet RoHS or other regulations.

In general all hazardous materials identified in U.S. Pat. No. 6,899,437 are known in automotive industry as this has been based on the European directive and several precautions are taken in commercial products. However, hazards due to beryllium although known, are largely ignored. Even U.S. Pat. No. 6,899,437 does not recognize this hazard or those due to arsenic and hexavalent chromium. All of the measures for the previously identified hazards can be optionally taken in addition to reducing the hazard from beryllium, or mirrors which only address the beryllium issue can be manufactured using this innovation.

Beryllium is a metal that is used in a wide variety of industries including electronics, aerospace, defense, and the Department of Energy (DOE) complexes. Exposure to beryllium containing particles can lead to a lung disease called chronic beryllium disease (CBD). CBD involves an uncontrolled immune response in the lungs that can lead to deterioration in breathing capacity and ultimately death. It is clear that even in processes where beryllium dust has been controlled to very low levels cases of disease still persist (Managing Health Effects of Beryllium Exposure, National Research Council, The National Academic Press, Washington DC, 2008)

In fact, there have been cases of CBD reported in people that have had no obvious direct contact with beryllium operations. Despite the fact that very low exposure levels can lead to CBD, the onset of disease can take decades. Quoted from a published article by Newman "Microgram for microgram, beryllium is one of the most toxic elements on the periodic table. When engineers select beryllium alloys for new applications, they consider its desirable properties of light weight, durability, conductivity, or neutron moderation. Unfortunately, they are often condemning workers "downstream" to a lifelong risk for an incurable illness that affects up to 20% of people exposed."

Recent new regulations from DOE dictate a permissible exposure limit of 0.2 µg/m³ in air, a housekeeping level of 3 µg/100 cm² on a surface, and a release level for materials after beryllium exposure where the surface contamination due to beryllium must not exceed 0.2 µg/100 cm². There is a discussion in the beryllium community that the permissible air exposure limit needs to be lowered to 0.05 µg/m³. The use of beryllium exposes workers who work upstream from auto component manufacturing, autoworkers, consumers and then those who are involved with the salvage industry.

Beryllium is used in the automotive mirrors in at least two places. One being the busbars or spring clips to provide power to the transparent conductors as beryllium-copper alloys and the other as beryllium oxide in the electronics where its properties of electrical insulation and high thermal conductivity are useful. The electronics for EC mirrors is housed in the mirror casing. In many shielding (from electromagnetic interference and radio frequency interference) operations, BeCu coatings and patterns are also used. Beryllium comprising alloys are also used extensively in power connectors, automotive terminals, switches and relays, SIM card contacts, switches, relays, sensors, and controls. BeCu alloys have high strength, low corrosion and excellent relaxation characteristics. Examples of beryllium copper alloys are for high strength are Alloys 25, 190, 290, M25 and 165 and those alloys selected for high conductivity are Alloys 3, 10, 174 and Brush 60. beryllium, nickel and copper alloy example is alloy 390. Alloy 360 comprises of beryllium, titanium and nickel. AlBeMet is an aluminum beryllium alloy. All of these alloys are available from Brush Wellman (Cleveland, Ohio).

Although materials for replacing beryllium in these specific applications are known, the hazard is not recognized by the auto industry and no active steps are being taken to reduce worker exposure or to reduce or eliminate the use of beryllium from components. Beryllium poses problems not only in automotive mirrors but anywhere where electronics is used as beryllium metal or as beryllium oxide. It is desirable to incorporate safe work practices or to get rid of this material from automobiles and preferably from any other consumer products and substitute with other suitable non-hazardous components. Beryllium as particles can enter the human body both through inhalation and through the skin. The particles are formed during cutting, cleaning, vapor processes, etc. Thus the greatest threat is to the workers engaged in operations with beryllium containing materials (e.g., both in manufacturing and recycling). Some of these particles are left over on the surface of the parts from prior processing operations and thus may enter the environment during use. In many components such as mirrors, high temperatures (in excess of 300 C) are not seen while the product is in use, thus it is not necessary to use beryllium alloys that typically result in high creep resistance at elevated temperatures.

A preferred substitute for beryllium oxide for use in electronics and integrated circuit chips as a good electrical insulator and with high thermal conductivity is aluminum oxide. Aluminum nitride and aluminum oxy nitrides are more preferred alternatives. For busbars, other than the alloys comprising of beryllium and copper there are many substitutes depending on the level of performance. Since the mirrors do not consume large currents and temperatures are generally restricted below 125 C, several choices are available. Some of these are phosphor bronze, titanium and steel (e.g. stainless steel 316, 304, 303 and 302). Some of the more preferred substitutes are alloys of cobalt and chromium (which may also comprise of tungsten, rhenium, gallium and aluminum (e.g. see U.S. Pat. No. 4,382,909); tantalum, nickel, tin and copper alloys; nickel-silicon-chromium and copper alloy from Kyoei Sangyo Ltd (Tokyo, Japan); Duracon, an iron nickel and cobalt alloy from Vacuumschmelze GmBh Co Kg (Germany) and Inconel X-750. Some other choices are 301 stainless steel (UNS#530100), aluminum brass alloy 688 (UNS #C68800), phosphor bronze alloy KLF5 (UNS#C50715) and silicon bronze alloy (UNS#C65400), copper-nickel-tin alloys, copper-titanium alloys (with copper from 0.5 to about 12% by weight, preferred range being 1 to about 3%). Many of the metals may have trace amounts of naturally occurring beryllium (typically less than 100 ppm), but beryllium is not actively added in these metals or their alloys.

Figure 2A:
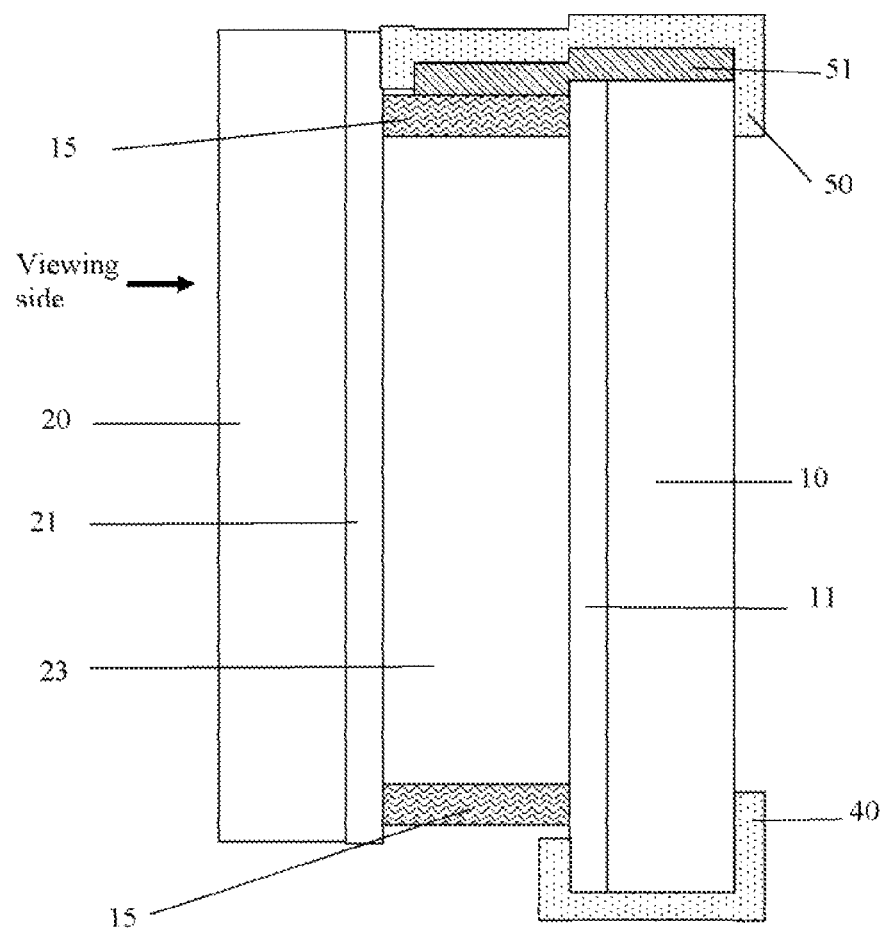
FIG. 2a: Side view (schematics) of a rear-view mirror showing electrical connections for both the busbars on the back of the rear substrate.
Figure 2B:
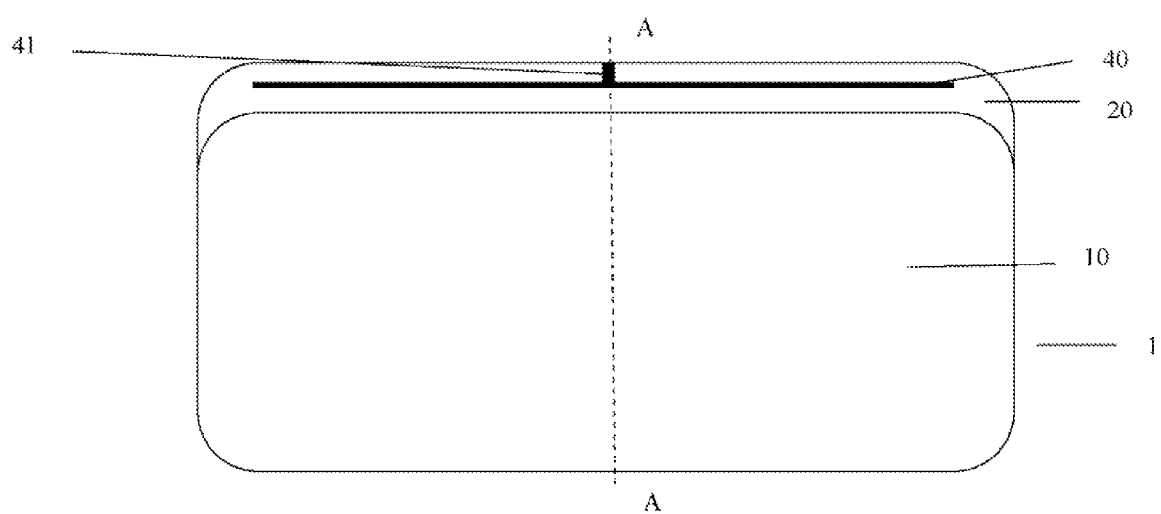
FIG. 2b: Front view of a mirror with busbar which is extended over the edge.

Further, one does not have to employ traditional busbars which are typically spring clips. One may form the busbars on the substrates by using conductive particles and or adhesives with conductive particles. The busbars formed from the conductive particles only are either sprayed or deposited from a paste. After deposition the busbar or the substrate is heated to fuse the particles and remove organic binder. A preferred spray process uses nano-particles of conductive materials. In a preferred embodiment of this process a solution comprising of nano-particles of metals (typically less than 50 nm in size and preferably less than 6 nm in size) is atomized by traditional processes (e.g., by ultrasonic process). This is then directed to an orifice using a carrier gas (typically nitrogen, air or argon that may also have vapors of the solvent comprising the solution to be deposited) and then in the orifice it is combined with a annular sheath gas (air, nitrogen air, etc and may also comprise of solvents present in the deposition solution or those compatible with it). The orifice may be a millimeter in size, but the sheath gas focuses the solution particles down in a range of about 10 to 200 microns. The particle diameter of the solution in the atomized beam is about 1 to 5 microns. A technology used for this type of process is available as M³D™ process by Optomec (Albuquerque, N. Mex.) is described in U.S. Pat. Nos. 7,045,015; 6,823,124 and in US patent application_20060233953. This stream may be guided with an X-Y-Z translation of the beam or the substrate to form a desired pattern. In this process, since the spray beam is well collimated, it avoids the traditional problems with spray processes. Further this can be applied for flat or non-planar substrates for mirrors. The metal nanoparticles are easy to sinter by heating the substrate or following up with a laser beam (e.g., Nd: YAG laser with a power less than about 10 mW) that provides local heating. Typically the heating temperature is less than 250 C, and for silver particles in a 5 nm size this may be only 130 C, as the melting point of nano-particles decreases rapidly with decreasing size. One can obtain electrical resistivity which is about 1.5 to 5 times less compared to that of bulk conductivity. Preferably, the busbar should have a surface resistance of about less than 100 milli-ohms/square and more preferably less than about 10 milli-ohms/square. Since the deposited metal busbars may be thin in profile (width less than 500 µm, and more preferably less than 200 µm), one can minimize the offset between the two substrates as seen in FIG. 1a, which leads to thinner bezels and more flush look of the mirrors. The busbars can be formed of a variety of metals and alloys, or these may be composites of one material coated on top with a more corrosion resistant material. Some of the materials are silver, nickel, copper, gold, titanium, tungsten, tin, indium and their alloys. Some of the more preferred materials are alloys of silver with dopants selected from one or more of gold, platinum, rhodium, palladium, ruthenium and neodymium where the weight concentration of dopants are typically less than 10% and more preferably less than about 3%. These dopants result in improving the corrosion resistance of silver while still maintaining high conductivity. These materials are consolidated on the surface by optical method (e.g. a following laser), or these can be brought to a molten state by heating and then consolidated on the substrate. Preferred range of thickness of such busbars is less than 25 μm, and preferably less than 10 μm. Since this process allows one to form lines on any shape, the busbars may be deposited on mirrors with non-planar substrates (e.g. for convex and multi-radius mirrors). These may also be extended from the front of the substrate to the rear of the back substrate where the connections to the electronics can be made (e.g., see published US patent application 2008/0074724). When coatings are taken from one surface to the next surface by going over an edge, it is preferred to avoid sharp corners on substrates, as these often lead to poor adhesion and/or variation in coating thickness that causes reliability issues. The edges or corners of the substrate should be rounded off or tapered to an average radius of about greater than 10 times (and more preferably 100 times) the coating thickness, as an example for a coating thickness of about 5 microns, the average radius of curvature should be in excess of about 50 microns (and more preferably greater than 500 microns). For glass this can be achieved by mechanical or thermal seaming. FIG. 2a shows an EC mirror device, which for convenience is shown as a third surface mirror with the reflective and conductive layer(s) being 11 on the substrate 10. This is bonded with a sealant 15 to another conductively coated transparent substrate 20 where the conductive (and transparent) coating is 21. The space between the two has an electrolyte 23 with electrochromic properties. The busbar 40 is formed so that it extends from the front of the surface to the rear. FIG. 2a is a side-section A-A of the mirror shown in FIG. 2b. In this, the mirror 1 is shown with two substrates 10 and 20 and the offset between the two is accentuated. The busbar 40 is shown with a tab 41 that extends to the back. The tab width and thickness can be any that is suitable and may be different from the busbar 40. Further there may be more than one tab emanating along the length of the busbar that are extended on to the rear and then joined. Further, one may deposit the busbar by conventional means such as silk screening of silver pastes and then form the tab by spray process mentioned above.

The busbar from the front substrate can also be brought to the back of the rear substrate without shorting. In U.S. Pat. No. 5,818,625, a part of the rear substrate is isolated and then this isolated area is shorted with the rear substrate to allow connections from the front of the rear substrate. This is difficult and expensive to process. In this invention, this can be easily done as shown in FIG. 2a. An insulating area 51 is formed (e.g., by the same spray process or any other means) using organic or inorganic materials, e.g., this may be UV or light cured acrylic, urethane or an epoxy. Then the busbar 50 is formed on the first substrate and then preferably using one or more tabs extended to the rear of the second substrate. Again it is preferred to round-off any sharp corners and edges. The underlying insulating coating is just a bit wider than the conductive tab. One may also coat both the busbars with an inert material to impart superior environmental protection. One may affix the circuitry (along with light sensors) and displays if used directly to the terminals in the back side of the rear substrate, or it may be connected by cables. The transmissivity of the third surface reflector could be increased (by limiting its thickness or providing pin holes) so that the light emitted from the display will pass through. The spray process may be used to form the internal busbars (e.g., see U.S. Pat. No. 6,317,248, which is included herein by reference). These internal busbars are particularly useful for large area devices (typically larger than 200 mm×200 mm in size), e.g., electrochromic windows used for architectural applications and transportation or even for truck mirrors. These busbars are located in the interior of the device in a line or a mesh pattern, and these supplement the conductivity of the transparent conductors (if used together) to increase the current carrying capacity of the transparent electrodes. As an example Metalon™ inks with nano-particles from Novacentrix (Austin, Tex.) or similar inks from Nanomas Technologies (Binghampton, N.Y.) or Inktec Co Ltd (Korea) may be used and the deposited particles fused using photonic curing (e.g available from Novacentrix) which uses optics (pulses of light energy) without raising the substrate temperature appreciably, and can thus be used on plastics substrates, paper and glass.

One may also use these principles of bringing the electrical connections to the back of the rear substrate for those mirrors which are made using no offset between the two substrates, e.g., see published US patent application US2006/0285190. In one embodiment in this patent application the main perimeter sealant is made conductive wherein about half of the sealant touches the conductive part of one substrate and about the other half touches the conductive part of the other substrate. One can use the spray or use other processes described above to form conductive paths which are in contact with the two parts of the conductive sealant and bring them over to the rear substrate of the mirror. Further these concepts of forming the busbars may also be used for those mirrors where a larger front substrate is used (larger front substrate concept is also described in this referenced published patent application).

The preferred rearview mirror assembly in accordance with one embodiment of the present invention is substantially free of beryllium. It is within the scope of the present invention to use any beryllium free spring clips and beryllium free coatings, connectors and beryllium oxide free coatings in electronics. It is also preferred to avoid the use of beryllium comprising alloys and beryllium oxide in automobiles and its components. Further, it is important to avoid use of beryllium along with at least one of the other hazards in the mirror such as mercury, cadmium, lead, hexavalent chromium, arsenic, and bromine.

Embodiment 2

Reduced Electrolyte/Reduced Environmental Impact Devices

Commercial EC mirrors use solid or liquid electrolytes. Typically these mirrors are made by sealing the perimeter of two conductive substrates, one of which is transparent. Typically the sealant has spacer beads to allow a fixed distance between the two substrates forming a cavity. Alternatively, spacer beads may also be sprinkled on one of the substrates prior to assembly. Generally, a small gap is left in the sealant so that after it is cured or solidified, electrolyte in a liquid form is introduced through this hole by backfilling and then it is sealed by another resin, typically radiation (UV) cured sealant. The cavity between these substrates is filled by an electrolyte (liquid or solid). Thinner gaps for electrolytes allow one to reduce the electrolyte consumption which typically comprises of several chemicals (e.g., solvents, salts, electrochromic dyes, UV stabilizers, residual monomers and initiators, etc.) and some of them could be toxic in larger amounts. In addition, one may reduce the environmental footprint by recycling components and using materials that are made by using reduced or renewable resources.

For mirrors one may use reflectors that are coated on fourth or third surface. The surfaces are numbered from the viewing side of the transparent substrate as "1" being the outside surface, 2 being the inner surface facing the cavity of the first substrate and the front of the second substrate facing in the cavity being third and the exterior surface of the second substrate being the fourth surface. Formation of such devices for mirrors, materials, incorporation of displays and electrolytes used are given in many patents, some of the exemplary ones included herein by reference are U.S. Pat. Nos. 7,300,166; 4,902,108; 5,140,455; 5,239,405; 5,500,760; 5,724,187; 6,002,511; 6,245,262; 6,870,656; 7,009,751. One may also use electrolyte lamination processes where the perimeter seal is dispensed (and may be partially cured), electrolyte dispensed in exact or in excess quantity in a pattern to fill the cavity when the second substrate is lowered. Most of the commercial EC mirrors have cavity thicknesses in the range of about 85 µm to about 300 µm depending on the electrolyte composition, size, etc. For example exterior mirrors are large and have cavity thicknesses on the order of 150 µm or more and the interior mirrors are generally 85 µm or more. This is because of the self erasing nature of these devices (i.e., the mirrors bleach when the power is removed), there is always current consumed in the colored state (leakage current). Thus the depth of coloration is compromised with increasing leakage current as that causes increasing voltage drop, which is the case when the cell gap (cavity thickness) is decreased for a given formulation. Generally the width of the cavity between the closest busbars (see "w" in FIG. 1a) is an important measure related to the cavity thickness. This is because for the same cavity thickness with increasing "w" the back reaction (and a given surface resistivity of the transparent conductor) will increase and at some point the voltage drop across the cavity becomes high enough that the devices do not color uniformly. Depending on the shape of the device "w" may vary; typically "w" for automotive interior mirrors rarely exceeds about 70 mm and is always more than 40 mm. Generally the transparent conductor conductivity of the commercial mirrors and window devices available today varies from about 6-20 ohms/square, where a typical range for interior mirrors is about 12-20 ohms/square and for exterior mirrors about 10-15 ohms/square and for windows (car, architectural, aircraft, etc) usually between 6 and 10 ohms/square. The resistivity decreases (conductivity increases) with increasing window size or "w". This is because with increased size leakage current hence the voltage drop increases, and to reduce the effects of voltage drop (shallow or non-uniform coloration), the transparent conductors are made more conductive. In doing this the cost of the transparent conductive coatings increase which impacts the product price and may also adversely impact bleach state transmission. EC device may be made in any thickness, such as U.S. Pat. Nos. 6,245,262 and 5,500,760 suggest EC devices for a variety of uses in a thickness range of 10 to 1,000 µm but do not provide any data on automotive mirrors fabricated less than 37 µm. It is interesting to note that there are a few examples in these patents where interior mirrors have been made in a cell thickness range of 37 to 50 µm. It is possible to make smaller self-erasing EC devices for other applications that have different requirements using electrolytes that are used in commercial automotive EC mirrors. However, for interior mirrors there were two things that were out of place, either these were liquid and a 6-8 ohm transparent conductor was used or these were solid with high polymer contents to limit the mobility of the electroactive species, e.g. EC dyes (to reduce back current). The polymer content was typically very high, -more than 30% (only one mirror had about 22%). The polymer content is based on the weight % of the monomers used in the electrolyte. When such high concentrations of monomers are used, they result in high shrinkage due to polymerization and result in poor durability. This is true where low viscosity liquid monomers are filled in cavities (usually by back filling), and then cured to convert them to solid. In all commercial mirrors to avoid shrinkage issues the polymer content of the electrolyte is limited to less than 15% and usually much lower than 10%. When this is done, then the mirror cavity thickness for interior mirrors typically is in the range of about 88 to 135 µm similar to the liquid mirrors. Similar argument is made for exterior mirrors, where commercially economic mirrors are made in a cell thickness range of 150 to 250 µm. Again some of the exterior mirrors in U.S. Pat. No. 6,245,262 with cavity thickness of less than 100 µm had a polymer content in excess of 40%. In this patent and in U.S. Pat. No. 5,928,972, both from the commercial supplier of mirrors all formulations with lower polymer content had cell gaps which are not too different from liquid cells. Both of the above patents are incorporated herein by reference. EC mirrors are made in more than 10 million units/year and they were commercially introduced about two decades back, and there are several hundred patents specifically on mirrors, however, the cell gap of these mirrors has remained almost unchanged or has been increased.

U.S. Pat. Nos. 6,853,472 and 6,961,168; 7,300,166 discuss the use of ionic liquids in the electrolytes, however it was only discovered by surprise in this disclosure that when such electrolytes with the right combination of dye concentrations are used one can fabricate thin devices that meet all of the optical, electrical and the durability characteristics comparable to any of the commercial devices. one could make automotive mirrors that were thinner than 37 µm. Further mirrors with liquid electrolytes or polymer contents lower than 10% can be made in this thickness range. In addition, interior mirrors can be made in thickness range of less than 50 µm using transparent conductors with a resistivity of greater than 12 ohms/square, exterior mirrors with 100 µm or less cell gaps with transparent conductor resistivity greater than 10 ohms/square. Liquid crystal mirrors can be fabricated using thin cavities in cells, but it has not been demonstrated for electrochromic mirror cells for automotive and other transportation applications. When the electrolyte thickness is reduced, it increases the leakage current (or the back reaction), or the steady current consumed in the colored state. This causes the mirror to color non-uniformly where it is darker near the edge busbars and lighter towards the center. To combat this effect one may use all or one of three remedies, either use higher conductivity transparent conductor so that the leakage current does not lead to appreciative voltage drop or reduce the leakage current by increasing the ionic concentration in the electrolyte or increase the electrolyte viscosity which also reduces the dye transport in the electrolyte. For interior mirror cells less than 50 µm in thickness and to attain reflectivity lower than 15% (preferably lower than 10%) we have found that an increase in ionic concentration is quite effective without any other non-desirable property changes and with a minimum impact on the cost. The ionic concentration of the electrolyte is dependent on the concentration of the materials in the electrolyte that have salt like structure, i.e. have anions and cations. These could be EC dyes and inert salts including ionic liquids. The concentration of the electrochromic dye for low leakage current devices should be greater than about 0.06M. If a pair of dyes is used, i.e., cathodic and anodic, then the total concentration of each dye should be greater then 0.06M. To attain low leakage current in lower electrolyte thickness cells, the total concentration of the ionic species should be preferably greater than 1M and more preferably greater than 1.4M and most preferably greater than 2M. Unless there is a substantial decrease in the electrolyte thickness, the increase in cost of the thicker transparent conductor (i.e., lower surface resistivity) may offset the cost so that there may not be any net benefit in terms of total device cost. For mirrors where "w" is on the order of 100 to 200 mm (a typical dimension for some of the exterior EC mirrors), the same metrics of ionic concentration apply when the cells are thinner than about 125 µm and preferably less than 100 µm (typically the present commercial exterior mirror cells are 150 to 200 µm in electrolyte thickness). For EC windows (e.g. EC aircraft windows) where "w" may be much larger than 200 mm the electrolyte thickness of the cells may have to be increased, but can still be kept below 250 µm, preferably below 150 µm. Further use of ionic liquids in EC aircraft windows decreases the system flammability.

One purpose of this invention is to enable technologies to reduce the electrolyte content by decreasing its thickness at an attractive cost. Lowering of electrolyte content reduces cost. Lowering of the electrolyte thickness also improves the optical quality of the image by reducing the separation between multiple images. The preferred thickness of electrolyte in interior automotive mirrors of this invention are less than about 35 microns and preferably less than about 30 microns, and most preferably less than 20 microns. The conductivity of the TC used should be preferably lower than 100 ohms per square for either third surface or fourth surface mirrors. However, any conductivity may be used if the product is superior and meets the customer cost requirements. For third surface mirrors, as indicated in the above references, the conductivity of the reflective surfaces (also used as conductors) is high and is typically less than about 2 ohms/square, and generally less than about 0.1 ohm/square.

Since these mirrors are used for automotive purposes, the preferred reflectivity range for interior mirrors should be greater than 70% and less than 10% (photopic or at 550 nm). For exterior mirrors one should achieve reflectivity greater than 45% and less than 15%. Preferred voltage required to color these should be less than 1.5V. As long as it is acceptable by the authorities in the region where such mirrors are used, other reflectivity ranges may also be used. In addition, these mirrors must also pass other criteria of low and high temperature performance, thermal shock and humidity resistance, seal durability, UV and cyclic durability as required by various car manufacturers and their product specifications.

Use of ionic liquids in electrolytes of EC devices is not new (e.g. see U.S. Pat. Nos. 7,064,212; 6,853,472; 6,961,168; 7,300,166), preferred ionic liquids, dyes and other additives (including those that result in solid electrolytes) for mirrors are provided in these patents which are included herein by reference. We were surprised to see that the use of ionic liquids and appropriate dye concentration in the electrolyte allowed us to fabricate mirror devices which colored uniformly and had extremely low cell gaps. A preferred dye concentration is typically greater than 0.05M, and preferably greater than 0.06M (if a redox dye pair is used, i.e., separate anodic and cathodic dyes, then the concentration of either type should be preferably greater than 0.06M). Further, these devices could be fabricated by using transparent conductors (e.g., indium tin oxide or fluorine doped tin oxide) which were about 12 ohms/square, although any suitable TC conductivity may be used. These devices increased environmental benefits but also reduced cost by using readily available substrates and reducing electrolyte consumption. Typical substrate thickness is between 0.9 and 2.4 mm for mirrors. Further, the thickness of the two substrates forming a cavity may be different. It is preferred that the anion of the dye be the same as that of the ionic liquid that is used. Some of the preferred fluorine containing anions for ionic liquids and the dyes are triflate ($CF_3SO_3^-$), imide ($N(CF_3SO_2)_2^-$), beti ($(C_2F_5SO_2)_2N^-$), methide ($(CF_3SO_2)_3C^-$), tetraflouroborate ($BF_4^-$), hexaflourophosphate ($PF_6^-$), hexafluoroantimonate ($SbF_6^-$), hexafluoroarsenate ($AsF_6^-$) and tris pentafluoroethyl-trifluoro phosphate (FAP i.e., $PF_3$ $(C_2F_5)_3$). Non fluorine containing anions, for example alkyl sulfate (e.g. $C_2H_5SO_4^-$) and tetracyanoborate may also be used. Devices with hydrophobic ionic liquids are preferred, as these may also be processed under less stringent inert conditions and provide superior durability. The preferred quarternary ammonium cations for ionic liquid include, but are not limited to, pyridinium, pyrrolidinium, pyridazinium, pyrimidinium, pyrazinium, imidazolium, pyrazolium, thiazolium, oxazolium, and triazolium. These can have various substitutions or substituents, such as H, F, phenyl and alkyl groups with 1 to 15 carbon atoms. Rings may even be bridged. Theses cations along with imide ($N(CF_3SO_2)_2^-$), beti ($(C_2F_5SO_2)_2N$), methide ($(CF_3SO_2)_3C^-$), and tetracyanoborate and FAP result in hydrophobic ionic liquids. The electrochromic dyes used should preferably have the same anions as that of at least one of the ionic liquids in the electrolyte. Since preferred electrolytes comprise of hydrophobic ionic liquids, preferred hydrophobic dyes have anions selected from one of imide ($N(CF_3SO_2)_2^-$), beti ($(C_2F_5SO_2)_2N$), methide ($(CF_3SO_2)_3C^-$), and tetracyanoborate and FAP. Although the preferred dyes are described in the references and used in the examples, typically these are viologen salts including those dyes where the viologens have been combined with anodic species such as with metallocenes (e.g., ferrocene) and phenazines. Other than the dyes other additives may be used for the electrolyte. Some examples are non-ionic solvents e.g., propylene carbonate, ethylenecarbonate, phosphates, esters, sulfolane, Additives such as UV stabilizers and viscosity modifiers or monomers (along with suitable co-reactants and catalysts) and polymers that will result in solidification of the electrolyte by reaction or by cooling. All these are given in extensive details within the references included herein. Further, inclusion of ionic liquids in the electrolyte impart flame retardant properties as they are difficult to ignite due to almost non-existent vapor pressure, which is particularly useful for transportation, and specifically windows on military vehicles and aircrafts.

Processing of these EC devices can then be done using methods similar to those in the liquid crystal industry and make use of the automation that is available. The perimeter adhesive may be dispensed by a variety of methods such as using dispensers or screen printing on one of the two substrates. Since the cavity thickness is small one may also deposit small dots of the adhesive with spacers in several interior areas of the cavity that will help in keeping substrates equally spaced throughout. These areas should preferably be smaller than 0.25 sq mm, and more preferably smaller than 0.04 sq mm in cross section so that these are not easily visible. In addition to these dots a perimeter adhesive is also dispensed. The two substrates are then brought together and the perimeter adhesive is cured. The adhesive should preferably be light in color or colorless, although optionally dark colored adhesives may be used. If these adhesive dots in the interior of the device are dispensed separate from the perimeter sealant, then these dots are made preferably of clear adhesive, and are cured before the main sealant is dispensed. These dots should preferably be UV cured and should be in a height of about 95% or lower as compared to the cured height of the perimeter sealant. Further, it is preferred that their mechanical modulus after curing should be less than that of the perimeter sealant and a preferred modulus range is about 1,000 to 200,000 psi. These measures ensure that when the perimeter sealant bonds the two substrates there is little or no stress on the perimeter bond due to the compression (if any) of these interior dots. One method of dispensing sealant dots in areas smaller than 100 μm×100 μm is by using a microdispenser or a localized spray process. Preferably as described earlier by maskless mesoscale materials deposition process ($M^3D$™) by Optomec Corporation (Albuquerque, N. Mex.). A hole may be left in the perimeter sealant which is used for backfilling the electrolyte in the cavity (or chamber) formed by the two substrates and separated by spacers and/or the perimeter sealant. After filling, the hole is plugged with a UV curing resin (plug seal). As is commonly know in the art, the plug seal materials for EC devices are the same that can be found for sealing the liquid crystal devices. This is recognized in US patent application 2009/0002803 for EC devices where several references to sealants for liquid crystal devices are given, however references to other sealants in liquid crystal devices that use epoxies cured by antimonates (e.g., see PCT patent application WO/2003/011939) is not provided, One may also use a seal bar or a dam made out of the perimeter sealant to offer resistance to the plug seal material so that it does not easily penetrate into the interior of the cell (e.g., see U.S. Pat. No. 6,473,148 for liquid crystal devices). It is very surprising that although this concept has been known in the liquid crystal industry but it has never been used in EC devices, although these devices have been used for commercial mirrors for two decades and the EC mirror manufacturers being very familiar with liquid crystal encapsulation techniques. The shape of the seal bar can be any and preferably its width is about 2 mm or less (preferably 1 mm or less) and its shape generally corresponds to the mirror curvature in the area of the plug and its length is greater than about 3 mm, preferably greater than 6 mm and its height is the same as the perimeter sealant. This bar may even be connected to the main seal and may have gaps for the electrolyte to flow through. The important issue is to provide increased resistance for the plug material to flow into the cell cavity, i.e. it reduces the direct access of material entering the plug hole area to the interior. This bar is a novel idea for EC mirrors and windows as it increases the process yield by reducing the rejects caused by the migration of the plug material far into the device before it cures. It is also possible that some of the components in the plug sealant may be more mobile. This is true regardless of the nature of the plug sealant and its compatibility with the electrolyte. FIG. 3 shows an interior EC car mirror incorporating such a bar. The substrate 30 is shown with a perimeter seal 33 with a gap 32 left for electrolyte introduction. Also shown is the bar 31 which would offer resistance to the plug sealant from migrating into the cell (in a commercial EC mirror the bar would be absent). The bar is preferably deposited along with the perimeter sealant and is made of the same material and has similar height. When the second substrate is lowered and the two substrates (empty cavity) bonded by this perimeter sealant, the bar also touches both the substrates and is also cured. After filling the cell with an electrolytic composition, the electrolytic composition may be solidified by cooling or polymerization. FIGS. 3b and 3c show magnified views of few more examples of alternative concepts of the bar or dams that may be used to restrict the flow of material from the plug area into the cavity These figures show part of the perimeter seal (33b and 33c) and the dam (31b and 31c) construction along with the gap (32b and 32c) for the electrolyte introduction.

One may also dispense the sealant before curing the electrolyte. The perimeter sealant is dispensed on one or both of the substrates, and then partially cured or its viscosity increased, and then the electrolyte is dispensed on one of the substrates towards the center of the cell, which flows out and fills the cavity as the top substrate is lowered and presses the electrolyte, or it may also overflow, i.e., the adhesion of the sealant and the substrate is not impaired even though the electrolyte had touched the area where the perimeter sealant would bond to. The sealant is then cured. This can eliminate the need for a plug seal. As an example U.S. Pat. No. 4,761, 061 describes this type of process to fabricate EC devices. In this case it is preferred to have an electrolyte which does not interact with the sealant. Use of hydrophobic ionic liquids in the electrolyte will not interact with most epoxy based sealants that are routinely used in the liquid crystal (LC) industry. Examples of some of the materials and process for sealants in the LC industry can be found in U.S. Pat. Nos. 7,101,596 and 7,292,306. A variety of plug sealants can be used e.g., see examples in U.S. Pat. No. 6,327,069, or those available commercially from Dymax (Torrington, Conn.) and Loctite brand from Henkel (Rocky Hill, Conn.).

The environmentally friendly mirror assemblies are those where the mirror cell cavity formed by two substrates is less than 50 μm in electrolyte thickness and are substantially free of one or more of lead, mercury, cadmium, beryllium, hexavalent chromium and brominated flame retardants. Most preferably the cells are less than 40 μm in thickness and are substantially free of all lead, mercury, cadmium, beryllium, hexavalent chromium and brominated flame retardants. The mirror assemblies comprise of housing including supporting arm, electronics and any other components located within the mirror housings.

To reduce the environmental footprint of the automotive mirrors, particularly in EC mirrors, one may also use recycled materials for the housing of the mirrors and other plastic components, such as the bezel, etc. Typically, the recycled content should be greater than 5% and may even be 100%. Typical thermoplastic polymers that are available as recycled materials are high density polyethylene (HDPE), polypropylene (PP), high impact polystyrene (HIPS), acrylonitirile, butadiene and styrene copolymer (ABS), thermoplastic elastomers (both urethane and olefin based), polycarbonate (PC), polycarbonate blended with ABS, and polyethylene terephthalate (PET). Typically current mirror housings are made of polypropylene or ABS, the bezels may be made of the same material or of other materials such as thermoplastic elastomers (polyolefin or urethanes) and many of the brackets inside the mirror may be made of engineering plastics such as nylon or lenses from acrylic and polycarbonate. Use of the same plastics over and over again and recycling many times may lead to deterioration of its properties. Thus these plastics may be marked with a universal symbol to show recycled content or the number of times it may have been recycled. Another way of decreasing the environmental footprint is to use polymers produced from renewable resources. Typically these materials use less energy to produce as compared to those from petrochemical feedstocks. To produce polyurethanes one may use polyols prepared from soyabeans or make use of polymers from polyhydroxyalkanates. A polyol produced from renewable sources is available from Cargill (Minneapolis, Minn.) as BiOH™. This polyol may also be used in solidification of electrolytes by polymerization for EC devices (see U.S. Pat. Nos. 6,245,262; 5,679,283 and 7,300, 166). Dupont (Wilmington, Del.) supplies Sorona® and Hytrel®. Castor oil based intermediates have been incorporated in nylons from BASF (Ludwigschafen, Germany), e.g. in Nylon 610; and Arkena (Colombes Cedex, France) supplies Nylon 11 and ReBax Renew. Some of the materials inside the housings that do not come in contact with the environment may also be made biodegradable so they degrade when subjected to a landfill. Further, one may mark the components of the mirrors, such as glass, EC cell, electronics and other key components so that depending on their age and condition these parts may be salvaged and re-used.

Embodiment 3

Reduced Thickness Glass Substrates with Tin Oxide Coatings

As discussed above the EC mirrors are made by bonding two substrates together at the perimeter and filling the cavity created between the two substrates with an electrolyte, and at least one of these substrates has a transparent conductive coating. For fourth surface mirrors both substrates have a coating of transparent conductor, whereas for third surface mirrors the front substrate must have the transparent conductive coating. In U.S. Pat. Nos. 5,128,799; 5,424,865 and 5,985,184 fourth surface mirrors are described where fluorine doped tin oxide is used as a transparent conductor. This coating is deposited on a float line where glass is produced. Typically the commercial coatings have been limited to a glass thickness of about 2.3 mm (single strength). This is because the tin oxide coating is formed by spraying a precursor on hot glass that decomposes to form the conductive tin oxide coating. If the float process is speeded to thin the glass, it is difficult to spray enough coating material to get a coating with a resistance of about 8-15 ohms/square that is used in the mirrors. The alternative solution is to sputter indium tin oxide (ITO, which typically is 80% or more indium in terms of atomic ratio with tin) on thinner glass (e.g., generally from about 1.1 mm to 2 mm in thickness for auto mirrors, as below 1.1 mm thickness, the glass can be quite brittle for such an application from a safety perspective unless it is strengthened. It is interesting that although fluorine doped tin oxide glass is available in 2.3 mm thickness in 15 ohms/square conductivity (e.g., TEC 15 from Pilkington, Toledo, Ohio) has been available for a long time, and it was actively considered and also used for commercial mirrors, and now its use in commercial mirrors is largely abandoned. Part of the reason is metal drip spots on these coatings that cause electrochemical interaction in the cell leading to visual defects. However, use of hydrophobic ionic liquids (references and descriptions given earlier) in electrolytes is useful from this perspective. This is because many of these ionic liquids do not support solvation of metal ions, and reduce the undesired electrochemical activity.

Thinner glass is preferred for many reasons, as it results in lighter weight product and helps the automakers to reduce the automobile weight in order to increase gas mileage, and also for curved (bent) mirrors it is easier to economically bend a pair of substrates with high precision so that the cavity thickness between the two substrates is uniform. If fluorine doped tin oxide is available on thin glass, such mirrors have many benefits in addition to promoting environmental friendliness. Since tin is cheaper and available in plenty as compared to indium, this makes the product more economical. Further, tin oxide can be coated on large substrates and then bent from which the mirror shapes can be cut. In the current process for bent mirrors, the substrates are first bent and then coated because ITO conductivity is compromised when heated above 300 to 350 C. Fluorine doped tin oxide can retain its conductivity when glass is heated to bending temperatures at about 500 to 600 C. For mirrors, the conductivity of the transparent conductors should be lower than about 40 ohms/square as taught in U.S. Pat. No. 5,128,799, further, many times it may be necessary to have barrier or anti-iridescent coatings (usually of silica) U.S. Pat. No. 5,424,865 to improve the optical quality and also to reduce haze which occurs by the formation of tin oxide crystals when contacted with alkali metals present in the glass (see US patent application 2004/0146720). Generally it is preferred to use coatings with haze of lower than 0.7% and more preferably lower than 0.3% and most preferably less than 0.2% for superior optical quality). All of these properties and features on thin glass for mirrors can be done by process changes and the necessity to find cheaper alternatives to ITO for display and other applications (Tolner, Harm, et al, Information Display, vol 24, p-28, April 2008). For most flat panel displays being used in consumer electronics, the preferred glass thickness is lower than 2 mm. Fluorine doped tin oxide coatings can be deposited on soda lime glass at high rates with conductivites in a range of 1.6 to about 40 ohms/square which is suitable for most mirrors (see, e.g., Ishida, et al, Thin Solid Films, vol 281/282, p-228 (1996)). This is typically done by chemical vapor deposition or photochemical vapor deposition of glass heated in a range of about 250 to 400 C. The gases comprising tetramethyltin (organo tin chlorides), oxygen source (e.g., air oxygen, ozone) and a fluorine source (e.g., hydrogen fluoride) are decomposed on the surface to form these coatings. In addition, by increasing the length of the float line, it is also possible to use the current process to deposit coatings in sufficient conductivity by increasing the length over which the spraying is conducted or such coatings may be deposited on drawn glass. Alternatively, for lower weight one may also use Indium-zinc oxide coatings (IZO) as such coatings in high conductivity may be deposited by sputtering on plastic substrates at low temperatures (see US patent application 2007/0,193,624) with high conductivity. Conductivities in a range of 10-15 ohms/sq may be achieved for coatings in the thickness range of 100 to 200 nm, and the In/Zn atomic ratio is preferably in the range of 8:1 to 10:1. Thus, thin glass with doped tin oxide (where tin is in excess compared to the dopant in terms of atomic percentage), particularly fluorine doped tin oxide may be used on thinner glass for EC automotive mirrors, or any of the EC devices where weight is an issue.

Figure 1B:
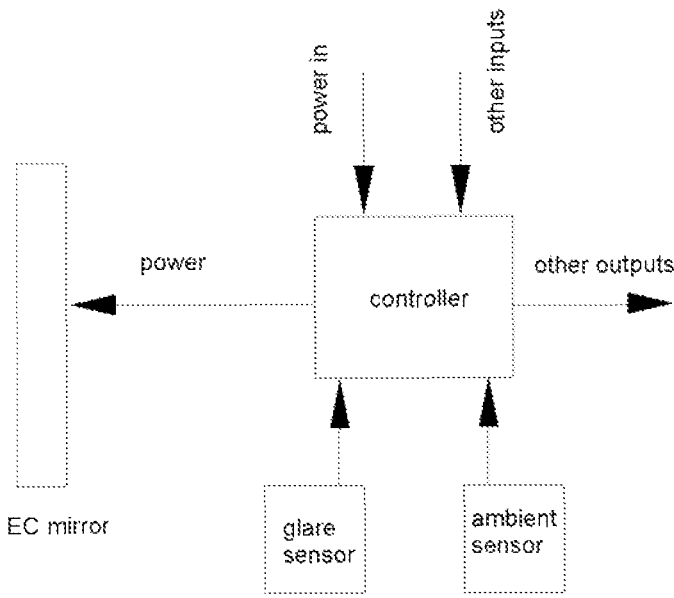
FIG. 1b: Schematics of an EC mirror assembly.

As commonly used, one may combine different thickness substrates. In reference to FIG. 1, lighter and stronger mirrors may also be produced by combining a thicker substrate in front (20) with a thinner substrate in the back (10). The increased thickness of the front substrate results in superior strength and shatter resistance when it is contacted. The front substrate may have a transparent conductor coating (21) of fluorine doped tin oxide on a glass substrate in a nominal thickness of about 2.2 to 2.4 mm and the rear substrate may be 1 to 2 mm thick glass. For third surface mirrors the rear substrate may be coated with a reflective conductor (11). This reflective conductor may comprise of a single coat or may have a stack of multiple coats of different materials. It is preferred that if a coat of transparent conductor is used in this stack, then it is free of indium (e.g., antimony doped tin oxide, fluorine doped tin oxide, aluminum doped zinc oxide, etc. may be used) or if an indium comprising layer is used (e.g., indium tin oxide or indium zinc oxide) then it is less than 500 nm in thickness.

Example 1

Preparation and Characterization of Solid Electrolyte

A solid electrochromic electrolyte (E1) was prepared by combining under nitrogen 1.0 gram of a copolymer of vinylidene fluoride and hexafluoropropylene, supplied by Solvay (Thorofare, N.J.) under the trade name Solef 20615/1001, with 10 ml of propylene carbonate while stirring at 130° C. for one hour. The mixture was cooled to room temperature and 0.3834 g (0.039 molar solution) of the electrochromic dye Fc-Vio imide (1-(4-ferrocenylbutyl)-1-methyl-4-bipridinium and 1,1,1-trifluoro-N-[(trifluoromethyl)sulfonyl]-methanesulfonamide salt) added under nitrogen atmosphere. Fc-Vio imide is a dye which has an anodic moiety (ferrocene) which is covalently linked to a cathodic moiety (viologen cation) and the anion is imide. The mixture was heated to 100° C. for one hour while stirring to form a complete solution. The electrolyte was degassed under vacuum for 10 minutes at 100° C. and when cooled to room temperature was a solid material. The viscosity of the electrolyte was measured using a Brookfield Digital Rheometer with a cone and plate attachment and temperature control to within 0.5° C. The results are shown in the following table:

| Temp ° C. | Viscosity (CPS) |
|---|---|
| 70 | 482 |
| 80 | 412 |
| 90 | 343 |
| 100 | 294 |
| 110 | 251 |
| 120 | 218 |

From the viscosity data, the glass transition temperature (Tg) of the electrolyte was calculated to be −70° C. The electrolyte had a solid to liquid temperature ($T_M$) of 82° C. as visually observed by leaving a sealed bottle of the electrolyte in the oven and perturbing the bottle. The viscosities were measured at elevated temperatures and then the electrolyte is cooled and measured periodically. The viscosities can be measured at lower than the melting points due to a supercooling effect, where it takes a long time for the material to solidify by crystallization or the temperature has to be lowered significantly before crystallization kicks in. Once solidified, the material has to be heated to higher temperatures than the solidification point for melting to take place.

Example 2

Preparation and Characterization of Solid Electrolyte E2

A solid electrolyte was prepared as described in example 1 above except the concentration of the polymer Solef 20615/1001 was increased from 1.0 to 1.43 grams (from 7.6 to 10.5 wt. %). The viscosity of the electrolyte was determined as described in example 1 and it had the following viscosity as a function of temperature:

| Temp ° C. | Viscosity (CPS) |
|---|---|
| 70 | 2527 |
| 80 | 1976 |
| 90 | 1572 |
| 100 | 975 |
| 110 | 768 |
| 120 | 622 |

From the viscosity data the glass transition temperature (Tg) of the electrolyte was calculated to be −95° C. The electrolyte had a solid to liquid temperature ($T_M$) of 82° C. from visual inspection in an oven as described above.

The thermal stability of the electrolyte was tested by repeated cycles between 25 and 130° C. with no change in the color or physical properties of the electrolyte. The electrolyte was stored at −19° C. for three days and at 50° C. for twenty four hours with no change in physical properties.

Example 3

Preparation and Characterization of Solid Electrolyte E3

A solid electrolyte was prepared in a mixed solvent system by combining under nitrogen 1.0 gram of Solef 20615/1001 with 9.5 ml of propylene carbonate and 0.5 ml of 1-butyl-1-methylpyrrolidinium salt with 1,1,1-trifluoro-N-[(trifluoromethyl)sulfonyl]-methanesulfonamide. This mixture was stirred at 130° C. for one hour to form a clear viscous liquid. The mixture was cooled to room temperature and 0.3227 g (0.03276 moles) of the electrochromic dye 1-(4-ferrocenylbutyl)-1-methyl-4-bipridinium salt with 1,1,1-trifluoro-N-[(trifluoromethyl)sulfonyl]-methanesulfonamide was added under nitrogen atmosphere. The mixture was heated to 100° C. for one hour while stirring to form a complete solution. The electrolyte was degassed under vacuum for 10 minutes at 100° C. and when cooled to room temperature was a solid material. The viscosity data for the electrolyte determined as described in example 1 is shown below:

| Temp ° C. | Viscosity (CPS) |
|---|---|
| 70 | 512 |
| 80 | 428 |
| 90 | 356 |
| 100 | 294 |
| 110 | 253 |
| 120 | 218 |

From the viscosity data the Tg of the electrolyte was calculated to be −65° C. The electrolyte had a solid to liquid temperature ($T_M$) of 84° C. Results from the differential scanning calorimeter indicated that depending on the thermal history, the melting point onset was about 60° C., with a peak at about 65 to 71° C. with melting completed at about 73 to 78° C. A maximum melting enthalpy of 2.9 J/g was measured.

Example 4

Preparation and Characterization of Solid Electrolyte E4

A solid electrolyte was prepared by combining under nitrogen 1.427 grams of Solef 20615/1001 with 10 ml of propylene carbonate while stirring at 130° C. for one hour. The mixture was cooled to room temperature and 0.4186 g (0.055 moles) of an electrochromic dye where an anodic phenazine moiety was covalently linked to a viologen moiety (Ph-Vio $2BF_4^-$), was added under nitrogen atmosphere. The mixture was heated to 100° C. for one hour while stirring to form a complete solution. The electrolyte was degassed under vacuum for 10 minutes at 100° C. and when cooled to room temperature was a solid material. Details of the dye are given in the reference by Michaelis, A., et al, Advanced Materials, vol 13 (2001) p-1825.

Example 5

Preparation and Characterization of Solid Electrolyte E5

A solid electrolyte was prepared in a mixed solvent system by combining under nitrogen 1.427 grams of Solef 20615/1001 with 9.5 ml of propylene carbonate and 0.5 ml of 1-butyl-1-methylpyrrolidinium salt with 1,1,1-trifluoro-N-[(trifluoromethyl)sulfonyl]-methanesulfonamide. This mixture was stirred at 130° C. for one hour to form a complete solution. The mixture was cooled to room temperature and 0.4186 g (0.055 moles) of the same dye as in electrolyte E4 was added under nitrogen. The mixture was heated to 100° C. for one hour while stirring to form a complete solution. The electrolyte was degassed under vacuum for 10 minutes at 100° C. and when cooled to room temperature was a solid material.

Example 6

Cell Fabrication and Cell Filling

Two pieces of 12 Ω/sq. ITO were cut into 2"×2.5" sections. One piece was drilled with two fill holes at opposite ends of the long diagonal. Cells were made by applying an epoxy containing spherical glass spacers (spacer size, e.g., 125,102 or 88 μm) to the perimeter of one of the ITO substrates. The second substrate was then placed on top of the epoxy coated ITO glass, in a position which was slightly off-set along the long side for busbar application (i.e., the busbar was applied on the short side). Clamps were applied to the assembly at the epoxy perimeter to ensure intimate contact as well as to ensure the cell spacing conformed to the spacer size in the epoxy. The epoxy seal was cured in an oven at 150° C. for one hour. They were then filled with electrolyte under a dry inert atmosphere by injecting the medium through one of the fill holes. Both the holes were subsequently plugged using a Teflon ball and sealed by a small glass plate (0.5 cm×0.5 cm and 1 mm in thickness) using a room temperature UV curing acrylic. The filling of cells was done at 100° C., where both the cell and the electrolyte were heated. Conductive metal clips (busbars) with soldered leads were placed on the two offset conductive edges. These formed the electrical contacts to each electrode.

Example 7

Cell Filling with Solid Electrolyte

A solid electrolyte was prepared with composition E3. This was used to fill two window cells prepared as described in example 6, one with a cell gap of 88 μm and the other 102 μm. The electrolyte and cell were heated to 100° C. to enable free flow of the electrolyte into the cell cavity. The color coordinates and percent haze of the cells were measured using an Ultra Scan XE Colorimeter in the total transmission mode. This data for the cells is shown in the following table:

| Cell Gap | X | Y | Z | % Haze |
|---|---|---|---|---|
| 88 μm | 75.41 | 81.74 | 78.62 | 0.05 |
| 102 μm | 74.90 | 81.14 | 78.21 | 0.06 |

Example 8

EC Properties of Window Devices

Electrolytes were prepared with composition E1 except that the electrochromic dye concentration was varied between 0.039 and 0.055 molar. These electrolytes were used to fill cells prepared as described in example 6 where the cell gap was 125 and 88 μm. The room temperature electrochromic properties of the cells were tested using a Shimadzu 3100 spectrometer at 550 nm by applying a color potential of 1.2 volts for 50 seconds and bleached by shorting the electrical wires from the two substrates. The electrochromic properties were as follows:

| Dye Concentration (molar) | Cell Gap (μm) | Bleached, % T (550 nm) 25° C. | Colored, % T (550 nm) 1.2 volts for 50 seconds at 25° C. |
|---|---|---|---|
| 0.039 | 125 | 83.0 | 10.5 |
| 0.040 | 125 | 82.5 | 8.4 |
| 0.044 | 125 | 82.5 | 6.4 |
| 0.050 | 125 | 82.3 | 5.3 |
| 0.055 | 125 | 82.4 | 3.9 |
| 0.039 | 88 | 84.7 | 18.4 |
| 0.040 | 88 | 84.9 | 18.0 |
| 0.044 | 88 | 84.2 | 14.5 |
| 0.050 | 88 | 84.3 | 11.8 |
| 0.055 | 88 | 84.3 | 10.6 |

The percent haze in the cells was determined for a cell gap of 125 μm as a function of dye concentration and is shown below:

| Dye Concentration (molar) | % Haze |
|---|---|
| 0.0320 | 0.05 |
| 0.0382 | 0.03 |
| 0.0440 | 0.07 |
| 0.0500 | 0.07 |
| 0.0550 | 0.08 |

Example 9

EC Properties of Window Devices

A cell prepared as described in example 6 with a gap of 125 μm was filled with an electrolyte E4. The electrochromic properties of the cell was determined at 25° C. using an Ocean Optics Spectrometer. In the bleach state (uncolored) the cell had a transmission at 550 nm of 66.8% and when colored at 1.0 volts for 20 seconds had a transmission of 3.2% with a leakage current (current when a steady state in colored state is reached) of 1.94 mA/cm$^2$.

Example 10

EC Properties of a Cell

A cell prepared as described in example 6 with a gap of 125 μm was filled with an electrolyte E5. The electrochromic properties of the cell was determined at 25° C. using an Ocean Optics Spectrometer. In the bleach state (uncolored) the cell had a transmission at 550 nm of 66.8% and when colored at 1.0 volts for 20 seconds had a transmission of 2.8% with a leakage current of 1.27 mA/cm$^2$.

Example 11

EC Properties of a Mirror

A fourth surface interior mirror cell was fabricated (about 6×25 cm) with a cavity thickness of 63 μm with the transparent conductive coatings facing inside of the cavity. The substrates were slightly offset along the long direction to provide for busbar clips. The cavity was filled with an electrolyte E1 excepting that the dye concentration was 0.055 molar. The cell was powered by applying a potential of 1.3V and bleached by shorting the two electrodes. The cell characteristics in percentage reflection (% R) and kinetics are shown below at 550 nm.

| % R, Bleached | % R, Colored | Time to Color 50% range | Time to Color 80% range | Time to bleach 50% range | Time to bleach 80% range |
|---|---|---|---|---|---|
| 82.4 | 14 | 0.9 sec | 2.0 sec | 1.3 sec | 1.8 sec |

Example 12

EC Properties of a Mirror

A mirror was fabricated by making a cell as in Example 6 with a cavity thickness of 125 μm and was then filled with the electrolyte E2 with the Fc-Vio imide dye in a concentration of 0.04M. A mirrored piece of glass was placed behind this window (sixth surface mirror) with a drop of water to reduce the reflective losses due to an air gap between the cell and the mirror. The cell was powered by applying a potential of 1.2V and bleached by shorting the two electrodes. The mirror assembly was powered by applying a potential of 1.3V and bleached by shorting the two electrodes. The cell characteristics in percentage reflection (% R) and kinetics are shown below at 550 nm.

| % R, Bleached | % R, Colored | Time to Color 50% range | Time to Color 80% range | Time to bleach 50% range | Time to bleach 80% range |
|---|---|---|---|---|---|
| 78.2 | 6.2 | 1.7 sec | 4.7 sec | 3.7 sec | 7.7 sec |

Example 13

Preparation and Characterization Cells with Electrolyte Gap of 30 μm

Mirror cavities were prepared using ITO coated glass (12 ohms/square) and one of the substrate had a protective silver coating on it's rear surface (fourth surface mirror) and epoxy perimeter sealant with 30 micron spacers. The glass thickness was 2.3 mm. The spacers were supplied by Duke Scientific Corporation, Palo Alto, Calif. and had a certified mean diameter of 30.1 μm with an uncertainty of ±2.1 μm. The distance between the busbars was the same as in the standard EC interior rearview automotive mirror cell (for this mirror device "w" was 56 mm as shown in FIG. 1a). The cells had two fill holes at opposite corners of the glass top electrode for filling with electrolyte. The sealant in the cells was cured at 150 C, and three cured cells were taken at random and their cell gap measured using a micrometer to give a mean value of 31.7 μm. The cell was filled with an electrolyte which comprised of an ionic liquid 1-butyl-1-methylpyrrolidinium 1,1,1-trifluoro-N-[(trifluoromethyl)sulfonyl]-methanesulfonamide and propylene carbonate (in 60:40 volumetric proportion) along with 0.06M Fc-Vio imide dye (1-(4-ferrocenyl-butyl)-1-methyl-4-bipridinium and 1,1,1-trifluoro-N-[trifluoromethyl)sulfonyl]-methanesulfonamide). Assuming no change in volume when the ionic liquid and the PC are mixed, the total concentration of the ionic species including the dye is 2.05M. This is a bridged dye with both anodic and cathodic moieties bonded covalently. One could also use separate dyes such as viologen salt and phenazine as used in several of the references described herein. Electrochromic properties of such a cell are shown in the table below. Optical properties were measured at 550 nm. High end refers to the reflectivity in the bleached state and low end refers to the reflectivity in the colored state. The range refers to the difference between the two.

| Temperature | Potential (volts) | High End (% R) | Low End (% R) | Time to Color 50% of the range (seconds) | Time to Color 80% of the range (seconds) | Time to Bleach 50% of the range (seconds) | Time to Bleach 80% of the range (seconds) |
|---|---|---|---|---|---|---|---|
| 50° C. | 1.2 | 71 | 7.8 | 1.6 | 3.4 | 2.0 | 3.0 |
|  | 1.3 | 71 | 6.5 | 1.8 | 3.0 | 2.2 | 3.4 |
| 25° C. | 1.2 | 73 | 7.1 | 1.4 | 3.0 | 2.6 | 3.8 |
|  | 1.3 | 73 | 6.7 | 1.0 | 2.6 | 2.6 | 4.0 |

The leakage current (steady state current in the colored state) for several cells at various coloring potentials is shown below.

| Cell # | Voltage (volts) | Temperature (° C.) | Leakage current (mA/cm²) |
|---|---|---|---|
| B | 1.2 | 50° C. | 1.204 |
|   | 1.3 |        | 1.412 |
| C | 1.2 | 25° C. | 0.812 |
|   | 1.3 |        | 0.933 |
| A | 1.2 | −20° C. | 0.152 |
|   | 1.3 |         | 0.156 |
| B | 1.2 | −20° C. | 0.062 |
|   | 1.3 |         | 0.062 |
| C | 1.2 | −20° C. | 0.110 |
|   | 1.3 |         | 0.110 |

Example 14

Preparation and Characterization Cells with Electrolyte Gap of 12.5 μm

Fourth surface mirror cells with a 12.5 μm cell gap were prepared using 12.5 μm polyester sheeting as spacer. A gasket was cut from the sheeting and was placed between a mirror ITO and a glass ITO substrate (12 Ω/sq), with drilled fill holes, to form a cell. The cell was then clipped together with binder clips and a two part epoxy was used to seal all edges of the cell. The busbars were a distance of 6.7 cm from each other and the active area distance between the busbars was the same as that in a interior mirror device. This cell was filled with electrolyte of 30% PC, 70% IL (proportions by volume) and 0.12M Fc-vio imide dye. The total concentration of the ionic species calculated as in the above example is 2.44M. Kinetic traces were taken at 1.2V, 1.3V and 1.4V at room temperature.

| Potential Color (V) | High end % R 550 nm | Low end % R 550 nm | Time to Color 80% range (Seconds) | Time to Bleach 80% range (Seconds) |
|---|---|---|---|---|
| 1.2 | 74 | 8.3 | 3.1 | 3.1 |
| 1.3 | 74 | 6.4 | 2.8 | 3.4 |
| 1.4 | 74 | 5.7 | 2.3 | 3.7 |

Example 15

Preparation and Characterization Cells with Electrolyte Gap of 6 Microns

Mirror cells with a 6 μm cell gap were prepared using 6 μm polyester sheeting as spacer. A gasket was cut from the sheeting and was placed between two ITO coated glass substrates (6 Ω/sq) with drilled fill holes, to form a window cell. The cell was held together with binder clips and a two part epoxy was used to seal all edges of the cell. The busbars were a distance of 6.7 cm from each other and the active area distance between the busbars was the same as that in a interior mirror cell. To form a mirror another silver coated glass surface was attached to the above window cell (6$^{th}$ surface mirror). An electrolyte comprising 70:30 (Ionic liquid to PC as in the above example) with a dye concentration of 0.12M was filled in the cavity and then sealed. The performance of this cell at room temperature (25° C.) is given below.

| Potential Color (V) | High end, % R 550 nm | Low end, % R 550 nm | Time to Color 80% range (Seconds) | Time to Bleach 80% range (Seconds) |
|---|---|---|---|---|
| 1.2 | 72.4 | 23 | 1.5 | 1.4 |
| 1.3 | 72.4 | 19 | 1.3 | 1.3 |
| 1.4 | 72.4 | 16 | 1.2 | 1.4 |
| 1.5 | 72.4 | 15 | 1.0 | 1.3 |

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. An electrochromic mirror or a window comprising a rear element and a transparent front element being sealably bonded together along the perimeter with a sealant in a spaced apart relationship to define a chamber; wherein the said sealant system further comprises of a gap for the electrolyte to be introduced into the said chamber and a dam close to the said gap.

2. An electrochromic mirror or a window as in claim 1 where the said sealant and the dam are made out of the same material.

3. An electrochromic mirror or a window comprising a rear element and a transparent front element being sealably bonded together along the perimeter with a perimeter sealant in a spaced apart relationship to define a chamber; wherein the said perimeter sealant system further comprises of a main perimeter seal and a dam, wherein the dam is associated with the gap in the main seal, and the said gap is associated with the electrolyte to be introduced into the said chamber, wherein the said dam resists the penetration of the plug sealant into the chamber during the operation of plugging of the said gap.

4. An electrochromic mirror as in claim 3, wherein in the perimeter sealant system and the dam and the perimeter sealant are made out of the same material or different materials.

5. An electrochromic mirror as in claim 4, wherein the dam may or may not contact with the main sealant.

6. An electrochromic mirror or a window comprising a rear element and a transparent front element being sealably bonded together along the perimeter with a perimeter sealant in a spaced apart relationship to define a chamber; wherein the said perimeter sealant system further comprises of a main perimeter seal, a gap in the said seal and a dam near the said gap, and both the dam and the main sealant are formed so that they are cured or solidified after the assembly of the two substrates.

7. An electrochromic mirror or a window as in claim 6, wherein both the dam and the main perimeter seal are formed in one operation.

8. An electrochromic mirror or a window as in claim 6, wherein both the dam and the main perimeter seal are of the same height.

9. An electrochromic mirror or a window as in claim 6, wherein the width of the main seal is different from the width of the dam.

* * * * *